Jan. 10, 1933.　　　　G. GERALDSON　　　　1,893,619
EARTH WORKING IMPLEMENT
Filed June 29, 1931
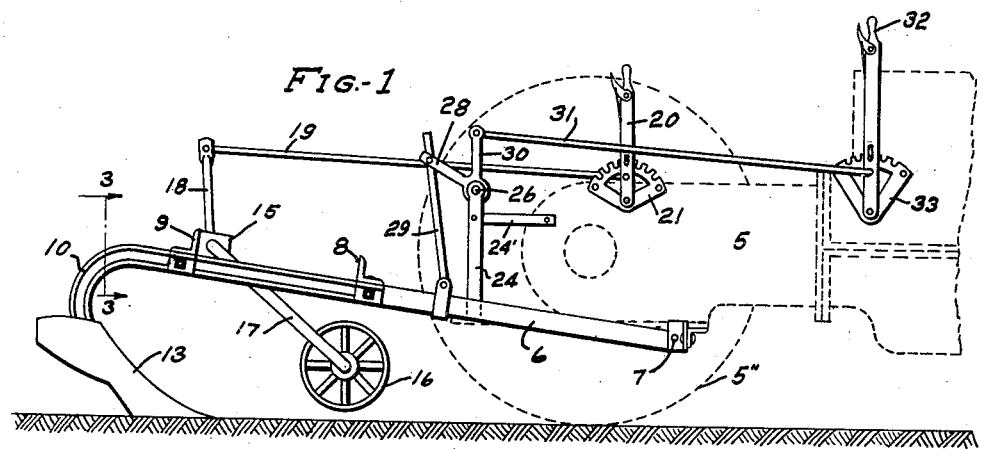
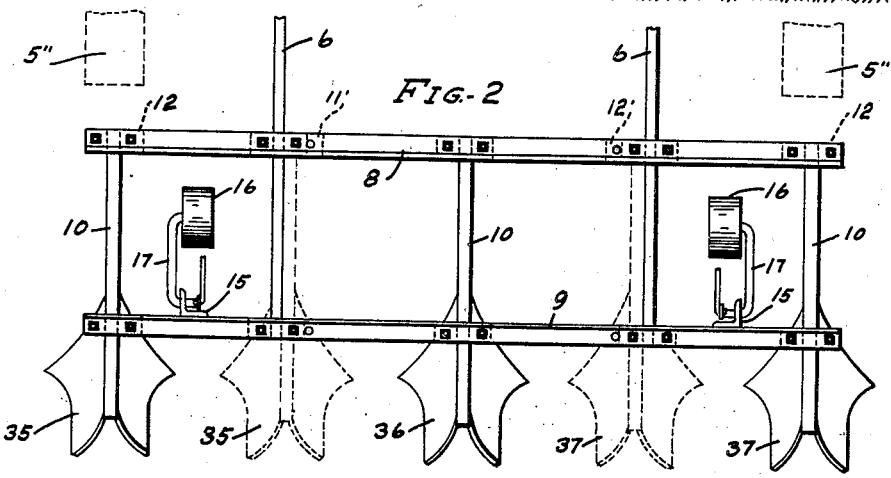
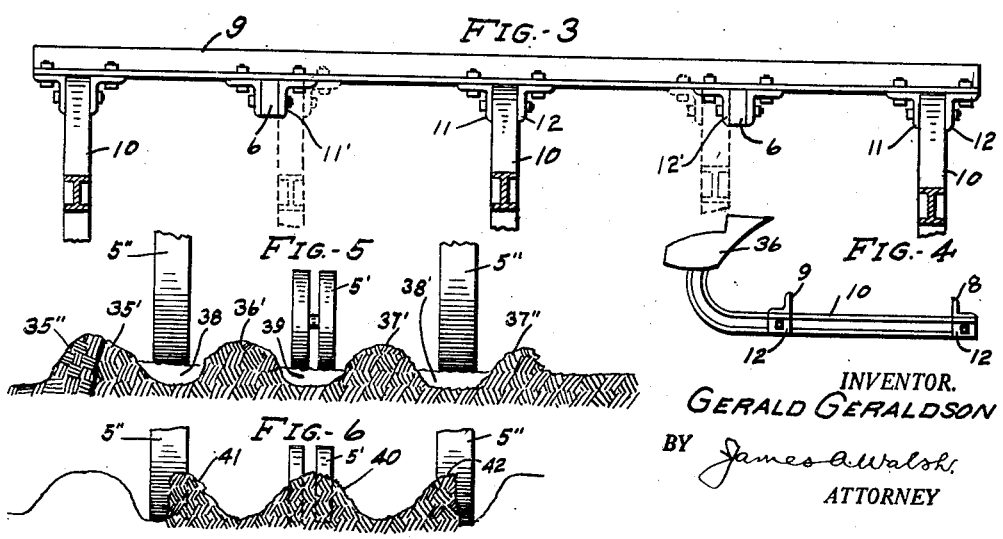
INVENTOR.
GERALD GERALDSON
BY James A. Walsh
ATTORNEY Patented Jan. 10, 1933

1,893,619

UNITED STATES PATENT OFFICE

GERALD GERALDSON, OF RACINE, WISCONSIN, ASSIGNOR TO J. I. CASE COMPANY, OF RACINE, WISCONSIN, A CORPORATION

EARTH WORKING IMPLEMENT

Application filed June 29, 1931. Serial No. 547,608.

My invention relates to that type of earth working implements commonly known as middle breakers adapted to be drawn by tractors for penetrating and loosening the earth preparatory to further tillage, and consists in certain details of construction and arrangements of plow bottoms or equivalent devices whereby the earth is plowed and developed into predeterminate spaced hills with furrows therebetween, and by adjustment of the bottoms the furrows are then plowed, so that a thorough disintegration of the earth is accomplished and the surface left in tillable and planting condition; my object being to accomplish such result by merely adjusting the tools of one implement instead of employing more than one for the operations referred to as commonly practiced.

In the accompanying drawing, forming part hereof, Figure 1 is a side elevation of my improved implement attached to a tractor, a fragment of the latter being shown in dotted lines; Fig. 2, a plan of the implement; Fig. 3, a detail vertical section taken on the dotted line 3—3 of Fig. 1; Fig. 4, an elevation of one of the beams and bottoms inverted; and Figs. 5 and 6 are diagrammatic views showing the formation of the earth surface and the relation of the tractor wheels thereto during plowing operations.

In said drawing the numeral 5 indicates a tractor to which the arms 6 of my improved implement are pivotally secured, at 7, and which at substantially intermediate their lengths are connected by a cross-bar 8, the rear ends thereof being also connected by a cross-bar 9, which connecting elements are preferably angle bars, as indicated in Fig. 1. To the cross-bars 8 and 9 I detachably secure curved plow-beams 10 by means of brackets 11, 12, between which the beams are bolted, each of said beams being provided with a plow bottom or other suitable tool 13, Fig. 1. The full lines in Fig. 2 indicate the normal assemblage of the plows for developing the predetermined spacel hills as indicated in Fig. 5, and which are maintained in constant alignment by the connection of the transverse members 8, 9, with the brackets 11, 12.

In bearings 15 I mount depth gage-wheels 16 by means of the pivotally connected arms 17 to which are secured standards 18, the latter being connected by links 19 to a hand-lever 20 of well known construction associated with a toothed quadrant 21. To one side of the tractor a standard 24 is secured upon which a bell-crank is mounted by means of a shaft 26 extending to the opposite side of the tractor and supported by a standard (not shown) similar to standard 24, the latter being braced by a bar 24' secured thereto and connected to the tractor. One member 28 of the bell-crank lever is connected by a link 29 to one of the arms 6, while the member 30 of said bell-crank is connected by a link 31 to hand-lever 32 working in a quadrant 33 in a well known manner.

As indicated in Fig. 1, the implement is in position to begin operations in substantially level land about to be tilled, and upon movement of the tractor the lever 32 is manipulated so that the bottoms will penetrate the land, the depth thereof being controlled by the gage-wheels 16 which are adjustable in vertical directions through the linkage 19 and levers 20 so that the plowing may be as deep or shallow as conditions demand. As the implement is being drawn the left side of the bottom 35, Fig. 2, throws the earth accordingly into a half hill formation 35' as indicated in Fig. 5 while the right side of said bottom and the left side of the bottom 36 throw up the hill 36', and at the same time the right side of bottom 36 and the left side of bottom 37 form the hill 37', the right side of said bottom 37 forming the half hill 37'', which initial disruption or breaking of the land is commonly termed busting, it being understood that when the implement is turned at the end of the row the outer bottom will be run closely enough to a half hill as to plow another half hill and throw it against the one previously made, as 35'', so as to form a complete hill, and that the edge of the field will be of half hill formation.

After busting the field in the manner described the outer bottoms 35 and 37 with their beams are removed, and the bottom 36 is also removed from its beam, in which condition the frame will be braced by the latter beam.

The brackets 11' and 12' are then shifted laterally away from the arms 6 to the positions indicated in dotted lines in Figs. 2 and 3, and the beams 10 supporting the bottoms 35, 37, are secured between the arms 6 and brackets 11', 12', by means of bolts, as will be readily understood, the beam for bottom 36 being then removed, so that the equipment will comprise but the two bottoms 35, 37, indicated by dotted lines in Fig. 2. However, instead of removing the bottom 36 and its beam, the bottom may be either removed and the beam or said parts as a unit may be turned to the inverted position indicated in Fig. 4, so that the bottom 36 will not interfere with bottoms 35, 37. When the equipment includes three bottoms as shown in full lines in Fig. 2 the two hills and two half hills are developed as shown in Fig. 5. However, where land is in heavy and tough condition so that the tractor is unduly burdened it becomes advisable to employ only two busting tools as 35, 37, to which the implement may be reduced by removing or inverting the intermediate tool-carrying beam, and when the re-busting operation is to be performed said bottoms 35, 37, may be brought to the positions indicated by dotted lines in Fig. 2, so that by merely adjusting the same equipment the one implement functions for both duties, and therefore more than one implement as commonly employed is unnecessary for these purposes when my improvement is applied and operated in the manner stated. The tractor is then propelled, its steering and driving wheels 5' and 5", respectively, traveling through the same furrows 38, 38'. and 39 formed by the busting operation as indicated in Fig. 5, when the bottom 35 will plow through the hill 36' and half of each furrow 38, 39, and the bottom 37 will likewise plow hill 37' and the remaining half of furrow 39, as well as half of furrow 38', so that the two hills 36' and 37' shown in Fig. 5 will be developed into one hill 40 and two half hills 41, 42, shown in Fig. 6, which operation is commonly termed re-busting. The furrows 38, 38' and 39 throughout the entire field are thus plowed, with the result that the land is thoroughly disintegrated and prepared in a uniform manner to be further treated by planting, cultivating or other tillage methods, and which disintegrating or busting operations are performed by the same readily converted implement in the manner as described, without the requirement, as stated, of more than one implement for the purpose which it is now common to employ.

I claim as my invention:

1. An implement for breaking and disintegrating land preparatory to cultivation by tillage implements, comprising a frame, means for pivotally connecting the frame to a tractor, a standard on the tractor including a bell-crank, a link connecting the bell-crank with said frame, a lever on the tractor, a link connecting the bell-crank and lever whereby the bell-crank may be actuated to vertically adjust the frame, an arm pivotally mounted on the frame and having a gage-wheel at its lower end, a second lever on the tractor, and a link connecting the arm and second lever whereby the link may be actuated to vertically adjust said arm.

2. An implement for breaking and disintegrating land preparatory to cultivation by tillage implements, comprising a frame, earth working tools so mounted on the frame that the number and position thereof may be varied to operatively engage the land, means for pivotally connecting the frame to a tractor, means supported by the tractor for manually vertically adjusting the frame, means operatively connecting said adjusting means to the frame, an arm pivotally secured on the frame and having a gauge-wheel mounted thereon, means supported by the tractor for manually vertically adjusting the arm independently of the adjustment of said frame, and a link connecting the arm and said latter adjusting means whereby the link may be actuated to adjust said arm.

In testimony whereof I affix my signature.

GERALD GERALDSON.